April 20, 1926.
C. W. MORDEN
PAPER PULP BEATING ENGINE
Filed July 13, 1922
1,581,464
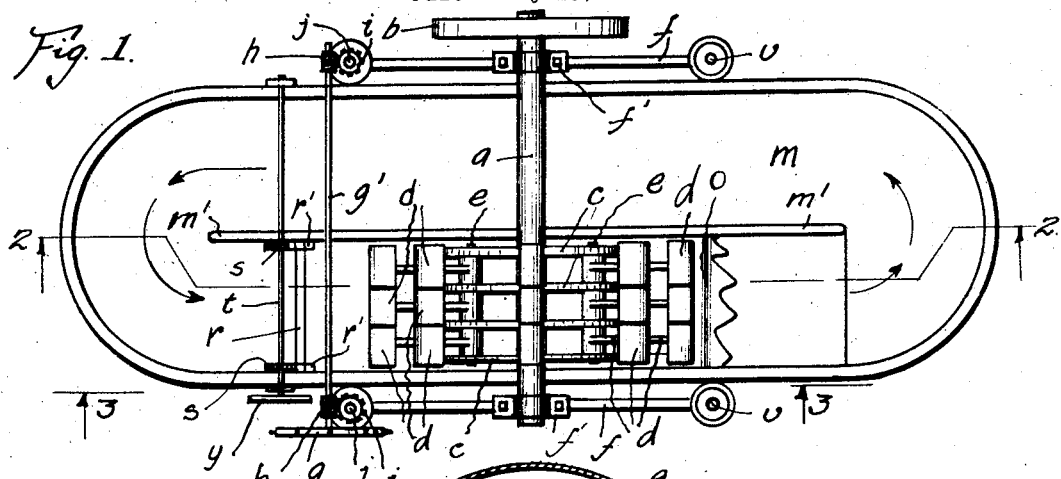
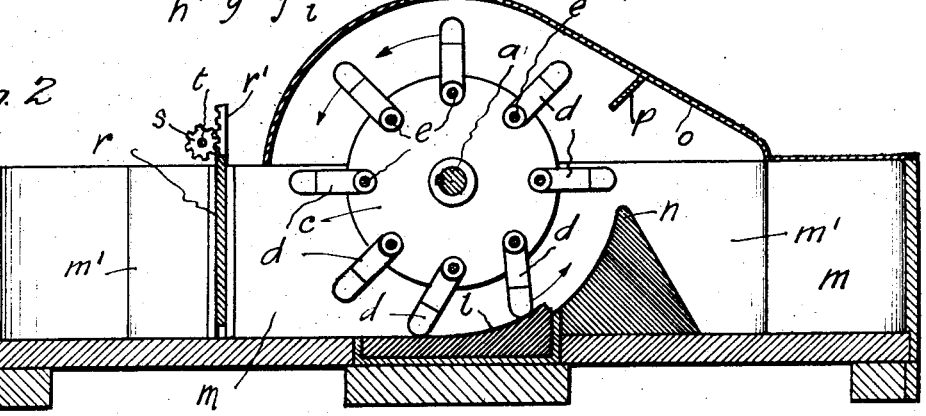
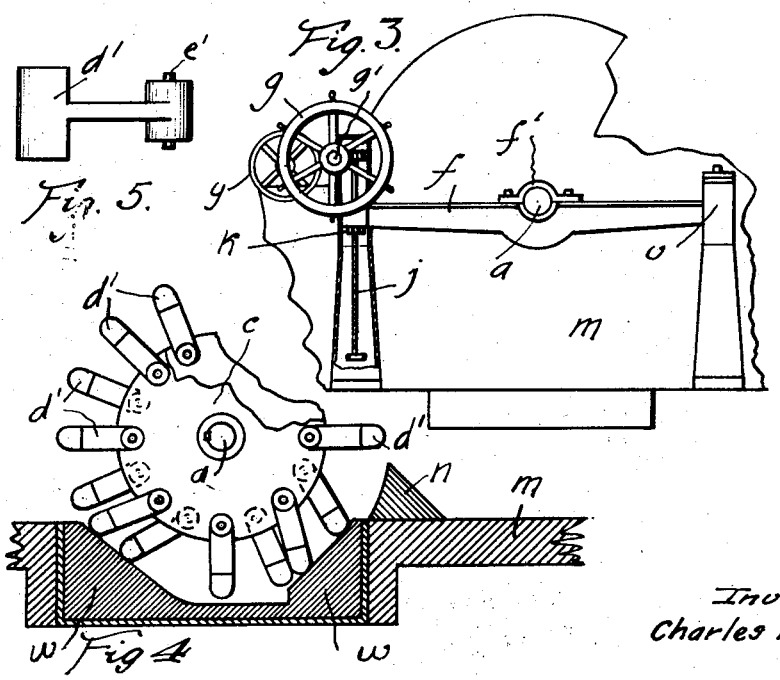
Inventor:
Charles Whitney Morden Patented Apr. 20, 1926.

1,581,464

UNITED STATES PATENT OFFICE.

CHARLES WHITNEY MORDEN, OF PORTLAND, OREGON.

PAPER-PULP-BEATING ENGINE.

Application filed July 13, 1922. Serial No. 574,671.

*To all whom it may concern:*

Be it known that I, CHARLES WHITNEY MORDEN, a citizen of the United States, and a resident of the city of Portland, county of Multnomah, and State of Oregon, have invented a certain new and useful Improvement in Paper-Pulp-Beating Engines, of which the following is a specification.

The object of my invention is to provide an improved machine for making pulp from harsh stock, such, for example, as chips, ground wood, sulphite screenings, or kraft stock, which require a thorough beating or pounding in the first place in order so to bruise the material as to separate the fibers and permit it to be removed by a brushing action following the beating action. My machine is especially adapted for use in the hydration of the stock and its refinement so as to produce long, strong fibers.

Briefly described, my machine may be said to comprise a rotated member provided with a hinged beater element free to be extended radially by centrifugal force, and an anvil surface arranged to intersect a segment of the path described by the extremity of said beater element when radially extended. Thus during each revolution of said member the beater element is caused to deliver a blow on the material spread on said anvil surface with such force as to bruise said material and loosen its fibers, and the beater element is then dragged over said anvil surface to brush out said loosened fibers.

My invention may be carried into practice by a machine constructed approximately as shown by the accompanying drawings, in which:

Fig. 1 is a plan or top view of my machine;

Fig. 2 is a sectional view taken on the line 2—2 of Fig. 1;

Fig. 3 is a side view taken on the line 3—3 of Fig. 1 and shows a mechanism for adjusting the beater relatively to the anvil surface of the bed plate;

Fig. 4 is a fragmentary sectional view similar to Fig. 2 illustrating a modification which can be made in the arrangement of the bed plates; and Fig. 5 is a detail of one of the beaters illustrated by the assembly shown in Fig. 4.

The rotating beater element is secured on the shaft $a$ which is revolved by a pulley $b$. The disks $c$, of which the beater element is made up, are keyed to the shaft $a$, and the beater arms $d$ are pivoted to the disks by rods $e$. The shaft $a$ is mounted in bearings $f'$ in the lighter bars $f$ and the whole beater element may be moved to and from the anvil surface $l$ by means of the mechanism shown in Fig. 3. The lighter bars $f$ are hinged at one end, and on the other end are connected with raising and lowering screws $j$ which are operated by means of a hand wheel $g$, which revolves the shaft $g'$ which in turn revolves the worms $h$. The worms $h$ revolve worm gears $i$ which are placed on the screws $j$ which turn in nuts $k$, which are placed immediately under the lighter-bars $f$. The nuts $k$ are positioned tightly against the lighter-bars $f$ and thus any motion of the screws $j$ will result in raising and lowering one end of the lighter bars, the other end of each of the lighter bars being pivoted at $v$.

When the beater element is rotated the beater arms strike the anvil surface $l$ which is set in a recess in the tub $m$ with such force as to bruise the material spread on the anvil surface to such extent as to loosen the fibers, which are then separated and brushed out by the beater arms being dragged over said anvil surface.

The pulp thus beaten and brushed is flung by the beaters against the housing $o$ and is deflected by a projecting piece $p$ known as a doctor. This causes the pulp to fall back into the tub $m$ behind the back fall $n$, and the revolving of the beater causes the whole mass of pulp to move forward over said back fall and around the mid-feather $m'$ as shown by the arrows in Fig. 1 until it comes back against the dam $r$.

The function of this dam $r$ is to allow only a proper amount of pulp to pass to the beater element so that the beater arms will not be hampered in action by having to plow through a large mass of pulp before striking the anvil surface. This dam is adjustable by means of racks $r'$ on the dam and pinions $s$, which are rotated by a rod $t$ which in turn is rotated by a hand wheel $y$. This dam $r$ tends to keep the mass of pulp from flowing too rapidly to the beater element, and the back fall $n$ tends to keep the pulp from moving back onto the anvil surface. This back fall also serves another purpose in that it keeps the mass of material close to the beater arms for a substantial period of time, and thus aids the circulation of the stock by the movement of the beater arms.

In Figs. 1 and 2 I show beaters which are alined and thus the beater arms in a line will all strike the anvil surface at the same time.

In Figs. 4 and 5 I show a manner of staggering the lines so that the beater arms $d'$, having separate stub shafts $e'$, will each beat separately, and thus tends to eliminate any pulsating or jarring action of the beater arms. I also show in Fig. 4 an anvil surface $w$ which has two striking surfaces; in this way the beating is made more frequent and the brushing action longer.

I claim:

1. In a paper pulp beating engine, a rotated member provided with a hinged beater element free to be extended radially by centrifugal force, and an anvil surface arranged to intersect a segment of the path described by the extremity of said beater element when radially extended, whereby during each revolution of said member the beater element first will deliver a blow on the material spread on said anvil surface tending to bruise said material and loosen its fibers, and the beater element will then drag over said anvil surface to brush out said loosened fibers.

2. In a paper pulp beating engine, a rotated member provided with a hinged beater element free to be extended radially by centrifugal force, an anvil surface arranged to intersect a segment of the path described by the extremity of said beater element when radially extended, whereby during each revolution of said member the beater element first will deliver a blow on the material spread on said anvil surface tending to bruise said material and loosen its fibers, and the beater element will then drag over said anvil surface to brush out said loosened fibers; and means for adjusting the rotated member relatively to said anvil surface.

3. In a paper pulp beating engine, a rotated member provided with a hinged beater element free to be extended radially by centrifugal force, and an anvil surface arranged to intersect a segment of the path described by the extremity of said beater element when radially extended, whereby during each revolution of said member the beater element first will deliver a blow on the material spread on said anvil surface tending to bruise said material and loosen its fibers, and the beater element will then drag over said anvil surface to brush out said loosened fibers; a housing for said rotated member, and a doctor projecting from the housing on that side where the beaters leave said anvil surface.

4. In a pulp making and refining device, a rotated member, a plurality of inflexible beaters hinged to such member, bed plate surfaces, said surfaces being intersected by the arc described by the extremities of said beaters when radially extended by centrifugal force, and an adjustable gate for controlling the flow of pulp material onto the bed plate surfaces.

CHARLES WHITNEY MORDEN.